(12) United States Patent
Frank et al.

(10) Patent No.: US 10,981,688 B2
(45) Date of Patent: Apr. 20, 2021

(54) WEIGHT MARKING MONITORING FOR PACKAGES

(71) Applicant: Multivac Marking & Inspection GmbH & Co. KG, Enger (DE)

(72) Inventors: Hendrik Frank, Enger (DE); Daniel Siegenbrink, Bielefeld (DE)

(73) Assignee: MULTIVAC MARKING & INSPECTION GMBH & CO. KG, Enger (DE)

( * ) Notice: Subject to any disclaimer, the term of this patent is extended or adjusted under 35 U.S.C. 154(b) by 246 days.

(21) Appl. No.: 15/960,325

(22) Filed: Apr. 23, 2018

(65) Prior Publication Data

US 2018/0312287 A1    Nov. 1, 2018

(30) Foreign Application Priority Data

Apr. 26, 2017    (DE) ..................... 10 2017 108 966.7

(51) Int. Cl.
*B65C 1/02*    (2006.01)
*G09F 3/10*    (2006.01)
(Continued)

(52) U.S. Cl.
CPC .................. *B65C 1/02* (2013.01); *B07C 5/32* (2013.01); *B65B 7/165* (2013.01); *B65B 9/045* (2013.01);
(Continued)

(58) Field of Classification Search
CPC ........ G01G 19/035; G01G 19/40; G01G 9/00; G01G 23/42; B07C 5/32; B65C 1/02;
(Continued)

(56) References Cited

U.S. PATENT DOCUMENTS 3,650,773 A * 3/1972 Bush ..................... B65B 61/025
426/383
5,156,193 A * 10/1992 Baruffato .................. B65B 3/28
141/1
(Continued)

FOREIGN PATENT DOCUMENTS

DE    102005018251 A1    10/2006
EP    2281749 A1    2/2011
EP    2345587 A1    7/2011

*Primary Examiner* — Robert F Long
*Assistant Examiner* — Xavier A Madison
(74) *Attorney, Agent, or Firm* — Husch Blackwell LLP (57) ABSTRACT

A packaging assembly including a sealing station for sealing a product with at least one film web, wherein a printer is provided upstream of the sealing station and configured to print information, in particular a product weight and an associated retail price, onto the film web or onto a label, which may already be present on the film web, wherein, upstream of the sealing station, a forward weighing device is provided and configured to detect a weight value of a product and forward it to a control unit. The packaging assembly is characterized in that the control unit controls the printer for printing-on the information depending on the detected weight value, and that, downstream of the sealing station, at least a first inspection device is provided to read the information on the imprint. A method for making the packaging assembly is also included.

9 Claims, 4 Drawing Sheets

(51) Int. Cl.

| | |
|---|---|
| *G06K 17/00* | (2006.01) |
| *B65D 77/20* | (2006.01) |
| *G01G 9/00* | (2006.01) |
| *B65C 9/46* | (2006.01) |
| *G01G 19/40* | (2006.01) |
| *G01G 23/42* | (2006.01) |
| *B07C 5/32* | (2006.01) |
| *B65B 61/26* | (2006.01) |
| *B65B 9/04* | (2006.01) |
| *B65B 7/16* | (2006.01) |
| *G01G 19/03* | (2006.01) |

(52) U.S. Cl.
CPC ................ *B65B 61/26* (2013.01); *B65C 9/46* (2013.01); *B65D 77/2024* (2013.01); *G01G 9/00* (2013.01); *G01G 19/40* (2013.01); *G01G 23/42* (2013.01); *G06K 17/00* (2013.01); *G09F 3/10* (2013.01); *G01G 19/035* (2013.01)

(58) Field of Classification Search
CPC ....... B65C 9/46; B65B 61/26; B65D 77/2024; G06K 17/00; G09F 3/10
USPC .............................................. 53/411, 51, 57
See application file for complete search history.

(56) References Cited

U.S. PATENT DOCUMENTS

| | | | | |
|---|---|---|---|---|
| 5,819,816 | A * | 10/1998 | Mayer ....................... | B65B 3/28 141/83 |
| 8,474,226 | B2 * | 7/2013 | Izquierdo ............... | B65B 9/045 493/11 |
| 2006/0272283 | A1 * | 12/2006 | Kawanishi ............. | B65B 57/14 53/51 |
| 2013/0283732 | A1 | 10/2013 | Potter | |
| 2017/0217622 | A1 * | 8/2017 | Wolff ....................... | B65C 9/46 |

* cited by examiner

WEIGHT MARKING MONITORING FOR PACKAGES

CROSS-REFERENCE TO RELATED APPLICATIONS

This Application claims priority to German Patent Application No. 10 2017 108 966.7, filed on Apr. 26, 2017, to Hendrik Frank and Daniel Siegenbrink, currently pending, the entire disclosure of which is incorporated herein by reference.

FIELD OF THE INVENTION

The present invention relates to a packaging assembly for marking packages with the price assigned to the packed product and a method for producing the same.

BACKGROUND OF THE INVENTION

EP 2281749 A1 discloses a thermoform packaging machine comprising a weighing unit in the infeed area, so as to ascertain the weight of products, which are then manually fed into the packaging troughs. The packaging trough into which the product taken from the scales is to be fed is indicated to the operator by a signal, and a monitoring unit monitors this process so as to ensure that the product in question has been fed into the packaging trough intended for this purpose. This course of action aims at ensuring that the information of the weight of the respective trough matches the information printed on a top film, the information being printed onto the top film before the latter closes the packaging troughs in a sealing station. It is impossible to detect if products should be removed or exchanged on the conveying path between the infeed area and the sealing station. This concept does not allow compliance with certain guidelines for calibrated weighing and approved pricing.

DE 102005018251 A1 discloses a tray sealer, in the case of which, after sealing, the packages are transferred to a weighing belt, so as to ascertain the specific weight of each package. Subsequently, the weighed package is transmitted to a marking belt and provided with a label on the upper side of the package. The label comprises weight and price information, said information being transmitted to a printer on the label dispenser. The concept according to which a package that has already been closed is weighed and provided with price information immediately after weighing corresponds, on the machine-side, to the admission to pricing, provided that the weighing belt and the marking belt cannot be accessed from outside.

SUMMARY OF THE INVENTION

It is the object of the present invention to provide an alternative embodiment of a packaging assembly for pricing packages, in particular in the food domain.

This object may be achieved by a packaging according to the present invention that comprises a sealing station for packing a product with at least one film web, preferably in a gas-tight manner. A printer may be provided upstream of the sealing station and configured to print information, in particular a product weight and an associated retail price, onto the film web or onto a label, which may already be present on the film web. In one embodiment, upstream of the sealing station, at least a forward (first) weighing device may be provided, said weighing device being configured to detect a weight value, corresponding to the product weight of the individual product, and forward it to a control unit. The packaging assembly according to the present invention may be characterized in that the control unit controls the printer for printing-on the information depending on the detected weight value, and that, within the packaging assembly downstream of the sealing station, at least a first inspection device may be provided, which may be configured to read the information on the imprint. In this way, the weight and/or price information of the respective product or product portion can be ascertained prior to sealing or also prior to the filling or infeed process, and printed-on in a package-related manner, e.g. by making use of a line motion control, also referred to as package tracking, in the area where the film web may be fed into the sealing station. The printing may take place directly on the film web, on a label that may be already present on the film web, or in advance on a label which will subsequently be dispensed onto the film web. The examination of the package, which takes place after the sealing process and in which the conformity of the printed-on price information with the associated product is checked, may be made possible using the first inspection device. The invention leads to a reduction of the space required for the packaging assembly, since marking may be already executed upstream of the sealing station.

A used herein, the term "product" describes not only a single product but also a product portion comprising of a plurality of slices or pieces of a foodstuff.

The film web may be a cover film for sealing onto troughs, which have been formed into a bottom film web by thermoforming, or for sealing onto trays, as well as a single film web that may be processed in the manner known on a bagging machine for packaging the product.

For a particularly advantageous embodiment that allows for calibration, a rearward (second) weighing device may be provided below the first inspection device, the rearward weighing device may detect the weight of individual packages, wherein the control unit or a further control unit may be provided and configured to verify for conformity the package weight and the printed-on weight and/or price information. Within the framework of the present invention, "verify" means that the information on the imprint read by the first inspection device downstream of the sealing station may be compared with respect to a certain degree of conformity with an associated value, which may be measured in a parallel measurement or which may have been stored after a preceding measurement.

The optional rearward weighing device, which may be arranged downstream of the sealing station, measures the total weight of a package, i.e. the sum of the product weight and the weight of the packaging material. During the verification process, this total weight has first deducted therefrom the known packaging material weight, which may be assumed to be constant, whereupon the resultant product net weight may be compared with the product weight printed as information on the package. Knowing the specific price (i.e. the price per unit weight), the product weight could, alternatively or additionally, be calculated from the printed-on retail price and compared with the product weight ascertained from the total weight of the package. If the product weights are identical or if they lie within a certain tolerance range (e.g. with a maximum deviation of two percent (2%) or a maximum deviation of five percent (5%), this will be regarded as a successful verification.

The control unit executing the examination may be the control of the packaging machine of the packaging assembly or the control of the first inspection device or of the rearward weighing device. By comparing the price information ascertained for the package located on the weighing device with the current product weight, a space-saving and highly effective pricing function can be accomplished, which also allows for calibration.

An alternative embodiment, which may be just as advantageous, provides a second inspection device, which may be configured to detect an identification of the container, e.g. a serial number or an unequivocal number, the control unit or a further control unit being provided and configured to verify the identification for conformity with the printed-on weight and price information. This embodiment, which may be preferably provided for a tray sealer or a thermoform packaging machine, can lead to an embodiment that may be calibrated, wherein the product weight ascertained using the forward weighing device may be associated with a package-specific identification in the control unit. The line motion control ensures that the weight and/or price information in question will be printed onto a cover film already prior to the sealing process. Analogously, the detection of the printed-on price information and the detection of the identification take place downstream of the sealing station using a respective inspection device and using the verification against the background of the product weight stored in the control unit as belonging to this identification or against the background of the identification expected on the basis of the line motion control.

Preferably, the packaging assembly comprises a thermoform packaging machine, the film web being here a cover film, which seals in one operating step a plurality of troughs filled with a product.

Alternatively, the packaging assembly comprises a tray sealer, the film web being here a cover film, which seals containers or trays that are filled with a product.

According to an alternative embodiment, the packaging assembly comprises a tubular bag forming machine, preferably a horizontal bagging machine, in which the product may be packed in the manner known.

The present invention also relates to a method of operating a packaging assembly comprising a sealing station for packing—preferably in a gas-tight manner—products with a film web, a printer for printing information, in particular a product weight and/or a price based thereon, onto the film web or onto a label that has been applied or may be to be applied to the film web, and a forward weighing device for detecting a weight value, wherein the forward weighing device may be provided upstream of the sealing station, the weight value may be ascertained and transmitted to a control unit using a weighing unit and the control unit controls the printer for printing onto the film web or onto a label, which has been applied or may be to be applied to the film web. The printer may print information onto the film web or a label, in particular the price and/or the product weight, calculated on the basis of the weight value ascertained by a weighing device. Furthermore, the imprint on the film web or on the label may be detected after sealing and verified for conformity and/or correspondence with the product weight of the associated product printed on the film web or label.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
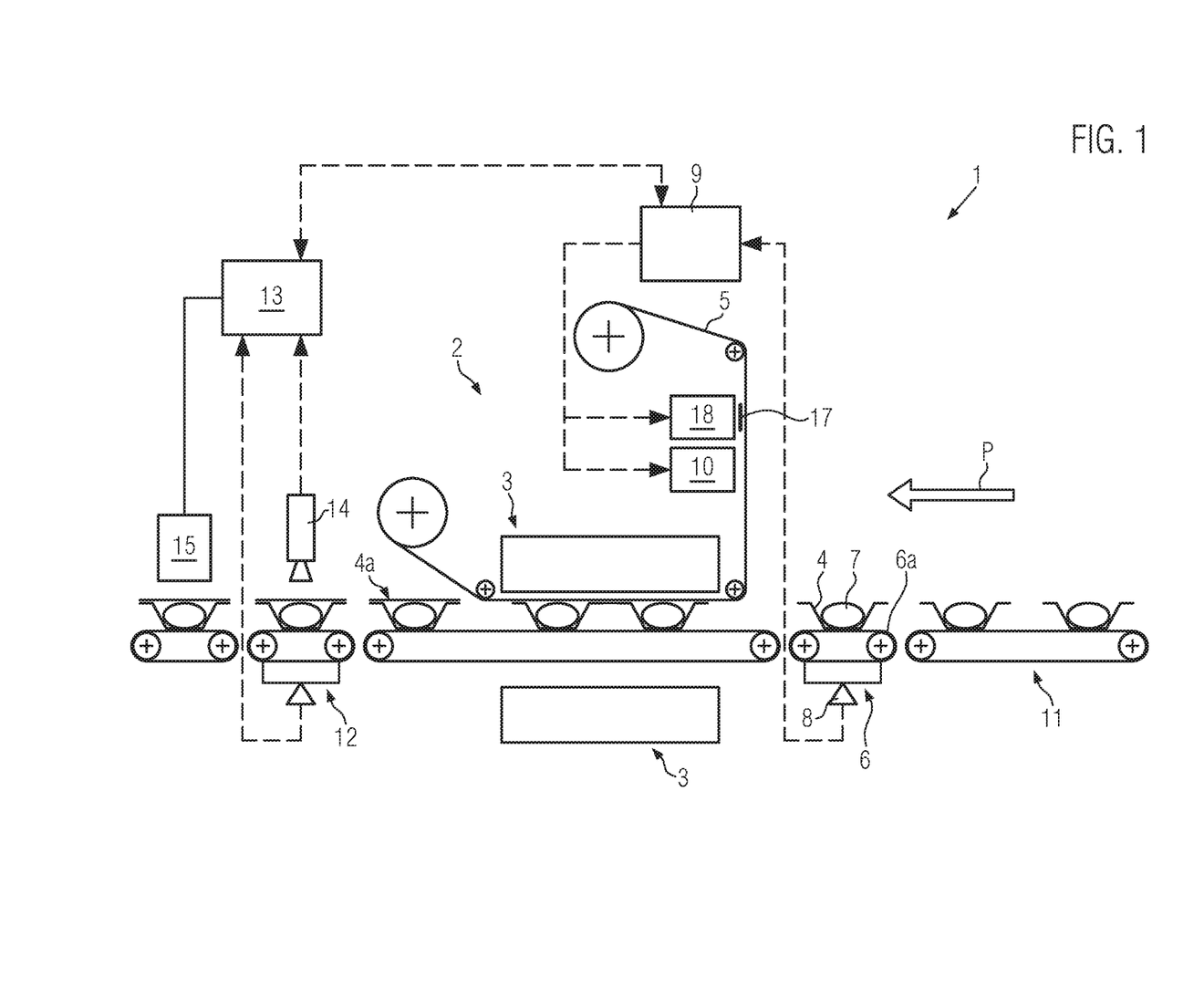
FIG. 1 is a schematic side view of one embodiment of a packaging assembly in accordance with the teachings of the present disclosure, wherein the packaging assembly includes a tray sealer.

FIG. 1 shows a packaging assembly 1 according to the present invention, comprising a schematically shown tray sealer 2 as a possible variant of a packaging machine. The tray sealer 2 comprises a sealing station 3, so as to seal containers 4 with a film web 5 in the form of a cover film. This can be done with or without a vacuum or under a modified atmosphere. In a production direction P, a dynamic, forward weighing device 6 is arranged upstream of the sealing station 3. This weighing device 6 may also be part of the tray sealer 2. The weighing device 6 comprises a conveyor belt 6a and is configured to weigh, e.g. also during the conveying movement, individual containers 4 filled with a product 7. The weight value ascertained in this way is transmitted to a control unit 9 from a load cell acting as weighing unit 8 of the weighing device 6. The control unit 9 may be the control of the tray sealer 2, of the packaging assembly 1 or also of a printer 10. The control unit 9 has stored therein respective data (in particular the specific price) concerning various products 7, so as to ascertain the associated price information for the product weight.

Figure 3:
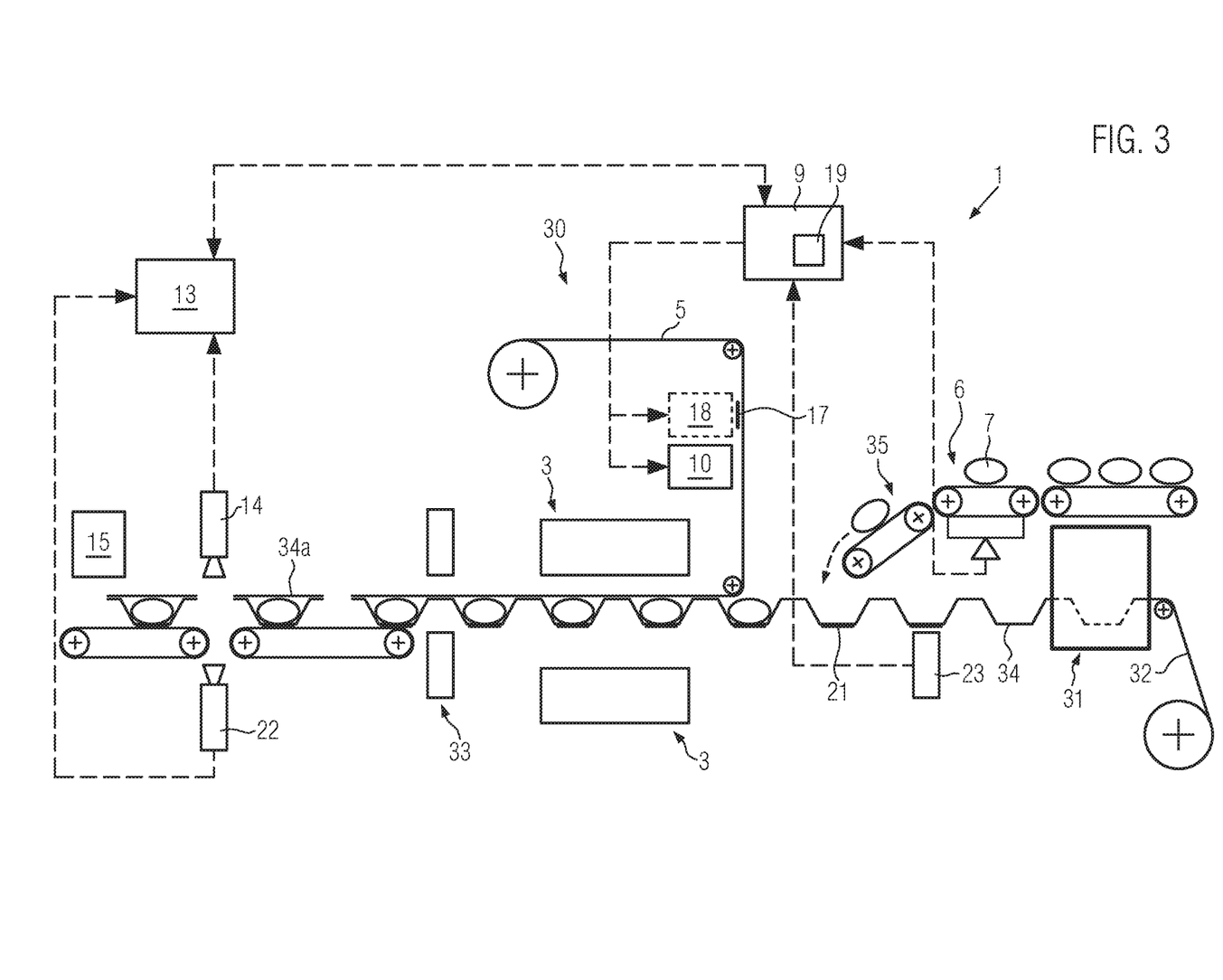
FIG. 3 is a schematic side view of one embodiment of a packaging assembly in accordance with the teachings of the present disclosure, wherein the packaging assembly includes a thermoform packaging machine.

The printer 10 is controllable by the control unit 9 and provided for printing the weight and/or price information onto the film web 5 at a position that will be sealed onto the respective weighed container 4 in the sealing station 3. Alternatively, the weight and/or price information may also be printed on a label 17, which is then applied by a labeler 18 to the film web 5 at the above described position. Hence, the weight of a container 4, which has already been weighed upstream of the sealing station 3, can, prior to the sealing process, be converted into a price information using a computer-based line motion control implemented in the control unit 9, said line motion control being also referred to as package tracking. If—as in FIG. 1—the weight of the product 7 is ascertained in a condition, in which the product 7 has already been placed into the container 4, the forward weighing device 6 or the control unit 9 will deduct from the weight value a predetermined packaging-material weight value, which is assumed to be constant, so as to determine the weight of the product alone, said weight being then printed-on using the printer 10. This kind of calculation can be dispensed with, when the forward weighing device 6 (as shown in FIG. 3) measures directly the product weight of the product 7 before the latter is placed into a container or a packaging trough.

The containers 4 are conveyed via a feed device 11 in the production direction P and they are transferred individually from the feed device 11 to the forward weighing device 6. Hence, the feed device 11 may also be implemented as a buffer belt. FIG. 1 shows a single-track variant. Also two- or multi-track variants are imaginable. In these cases, a forward weighing device 6 has to be provided for each track, so as to weigh the containers 4 individually.

The packages 4a, which are produced and sealed in the sealing station 3 and which can be produced as vacuum packages or as packages with a modified atmosphere, are, downstream of the sealing station 3, fed individually to a rearward weighing device 12, where they are weighed. This weight information is forwarded to the control unit 9 or to an additional control unit 13. An optical detection device (inspection device) 14, preferably a camera, provided above the rearward weighing device 12 detects the printed-on weight and/or price information and transmits the latter to the above-mentioned control unit 9, 13. The control unit 9, 13 compares the information of the rearward weighing device 12 and of the detection unit 14 with respect to its validity, i.e. it executes a verification. In the case of an error (i.e. a negative result of the verification), the control unit 9, 13 is able to activate a removal device 15 downstream of the rearward weighing device 12, so that such a faulty package 4a will be removed and will not be fed to the continued production process. The control unit 13 may be an additional control unit 13 or it may be identical with the control unit 9 of the packaging machine 2 or of the packaging assembly 1.

Figure 2:
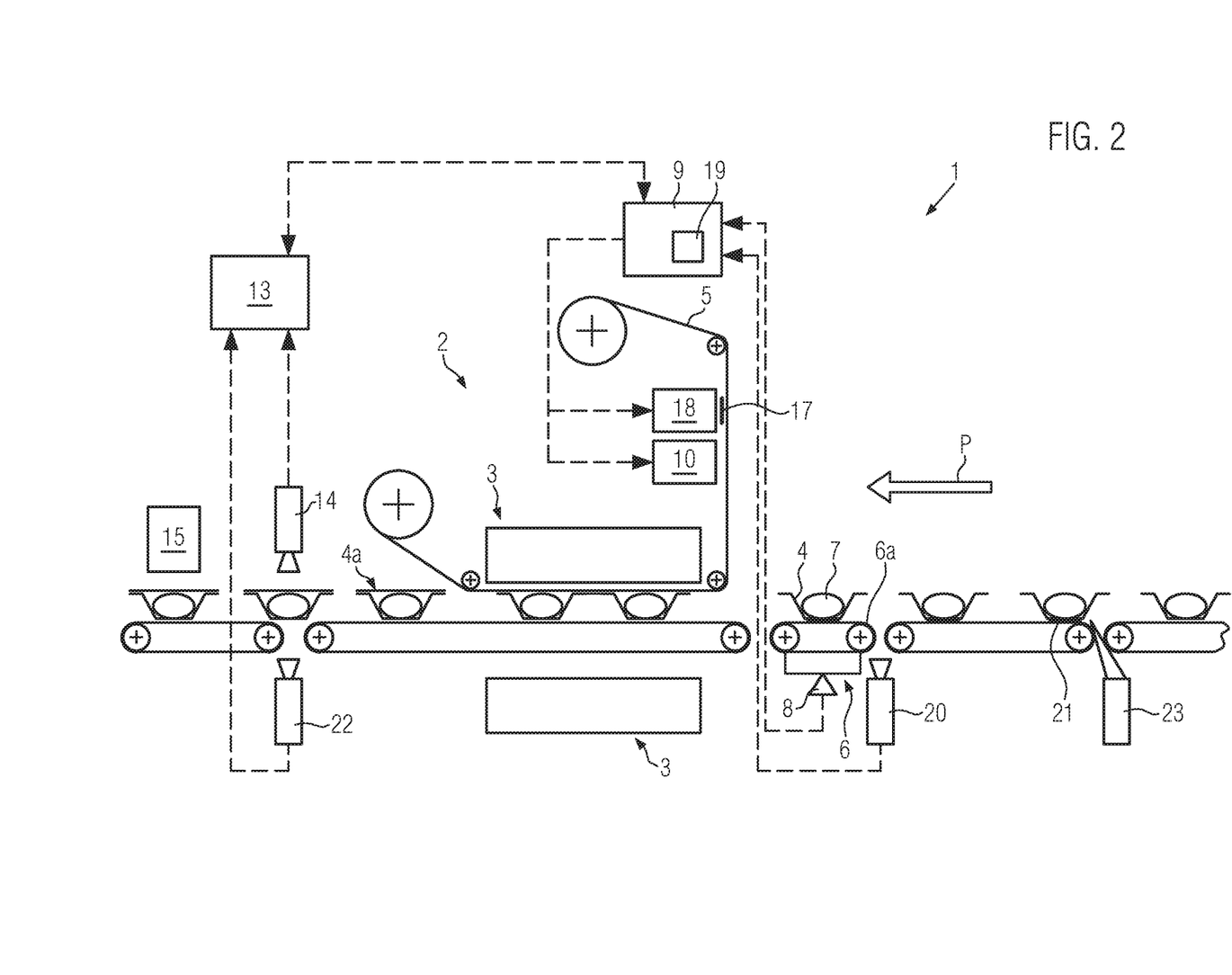
FIG. 2 is a schematic side view of another embodiment of a packaging assembly in accordance with the teachings of the present disclosure, wherein the packaging assembly comprises a tray sealer.

FIG. 2 shows a variant of the packaging assembly 1 according to the present invention comprising a tray sealer 2. This variant differs from that according to FIG. 1 insofar as a first optical detection device 20 is provided directly upstream or downstream of the forward weighing device 6 for detecting an unequivocal identification (e.g. a number) of the container 4 and transmitting said identification to the control unit 9. This unequivocal identification of the container 4 may be imprinted on the container 4 itself or it may have been attached, preferably using a labeler 23, to the lower surface of the container 4 in advance through a printed-on label 21. The label 21 may be attached during destacking of empty containers 4 or after the process of filling-in or feeding-in a product 7 or a product portion. By way of example, the optical detection device 20 is arranged in the form of a camera in the transition area from the feed device 11 to the forward weighing device 6 for detecting the identification of the container 4, which will be weighed subsequently. In the control unit 9, this detected identification has assigned thereto the product weight in a data set 19 and the film web 5 is provided with this information in accordance with FIG. 1.

A further difference in comparison with FIG. 1 is to be seen in that, instead of the rearward weighing device 12, a further lower optical inspection or detection unit 22 is provided downstream of the sealing station 3. Preferably, the further lower detection unit 22 and the upper detection unit 14 are arranged in opposed relationship, so as to compare almost simultaneously and jointly the identification on the lower surface and the weight and/or price information, which is printed on the cover film 5, of one and the same package 4a with the data of the associated data set 19 and, in the event of an error, sort out the package 4a at the removal device 15, so as to guarantee that only correctly marked packages 4a will be fed to the subsequent processes.

Alternatively, a labeling unit 23 for applying a label 21 with the identification or number of the container 4 may, instead of a first detection device 20, be provided upstream or directly downstream of the first weighing device 6. The labeling unit 23 itself will then transmit to the control unit 9 the identification of said container 4 so as to generate a data set 19 of related identification, weight and price, which will then be verified downstream of the sealing station 3 as described above.

FIG. 3 shows a further variant of the packaging assembly 1 according to the present invention, which comprises a thermoform packaging machine 30. Also this variant comprises a labeling unit 23, but differs from the variant according to FIG. 2 insofar as the product 7 is not fed into individual containers 4 but into troughs 34, which have been formed into a film web 32 by thermoforming using a forming station 31. A forward weighing device 6 ascertains as a weight value the weight of a product 7 or of a product portion before the product 7 is fed into or transferred to the trough 34. The feeding-in may be executed manually or using a robot unit. Also a transfer to an infeed belt 35 is imaginable. A label 21 with an unequivocal identification may be attached e.g. from below to still empty troughs 34. The line motion control in the control unit 9 may, via the position of the label 21 along the production line, combine into a data set 19 the identification of the trough 34 and the determined weight of the product 7 fed into the trough 34. As in the case of the above shown variants according to FIG. 1 and FIG. 2, the weight and/or price information is printed onto the cover film 5 such that, in the sealing station 3, this information is placed on the trough 34 and the product 7, respectively, associated with the data set 19. A cutting station 33 arranged downstream of the sealing station 3 produces separated packages 34a. The individual packages 34a are moved past the optical detection units 22 and 14 so as to forward to the control unit 13 and/or 9 the identification provided on the bottom surface and the price information printed on the top surface of the package 34a, so that the control unit 9, 13 will be able to compare the received data with the data set 19 belonging to the respective identification.

Figure 4:
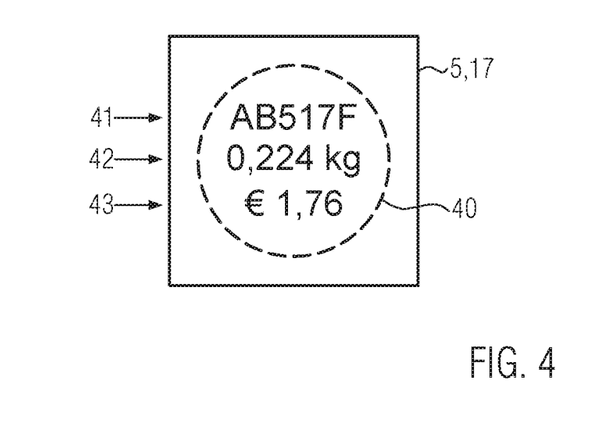
FIG. 4 is a schematic top view of one embodiment of an imprint on a label or on the film web in accordance with the teachings of the present disclosure.

FIG. 4 shows exemplarily an imprint 40 applied to a label 17 or directly to the film web 5 using the printer 10. This imprint comprises a package- or product-specific identification 41, which may consist of a combination of characters, such as letters and/or digits, but which may also be omitted completely. The imprint 40 additionally comprises as a first item of information 42 a product weight that has been ascertained and as a second item of information 43 a retail price 43 that has been calculated on the basis of the product weight.

Also an embodiment of the packaging machine 2 in the form of a tubular bag forming machine is imaginable, said embodiment being not shown in detail. In said tubular bag forming machine, the product 7 is sealed with a single film web 5 so as to form a package, the product 7 being here weighed before it is fed into or onto the film web 5. When the packages have been separated, they are weighed individually in accordance with FIG. 1 and the price information is detected and advanced to the control unit 13 or 9 for the purpose of verification.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging assembly comprising a sealing station for packaging a product with at least one film web, wherein a printer is disposed upstream of the sealing station and configured to print one or more item of information as an imprint onto the film web or onto a label, wherein said one or more item of information comprises at least one of a product weight and an associated retail price, wherein upstream of the sealing station, at least a forward weighing device is provided and configured to detect a weight value and forward the weight value to a control unit, wherein the control unit is configured to control the printer for printing the information depending on the detected weight value onto the film web or onto the label, and that downstream of the sealing station, at least a first inspection device is provided and configured for reading the information on the imprint; and
wherein a rearward weighing device is provided below the first inspection device, the rearward weighing device being configured to detect a package weight of individual packages, wherein one of the control unit or a further control unit is configured to verify the package weight detected by the rearward weighing device against the background of the information on the imprint.

2. The packaging assembly according to claim 1, further comprising a second inspection device configured for detecting an identification of a container, and wherein one of the control unit or a further control unit is configured for verifying the identification against the background of the information on the imprint.

3. The packaging assembly according to claim 2, wherein the second inspection device is arranged below the first inspection device.

4. The packaging assembly according to claim 1, wherein the packaging assembly comprises a thermoform packaging machine and that the film web is a cover film.

5. A method of operating a packaging assembly comprising the steps of:
sealing a product with a film web at a sealing station in a package;
printing at least one item of information onto one of the film web or a label using a printer prior to the sealing step;
detecting a weight value of the product weight of the product using a forward weighing device, wherein the forward weighing device is provided upstream of the sealing station;
ascertaining the weight value and transmitting the weight value to a control unit using a weighing unit;
controlling the printer using the control unit to print said at least one item of information onto one of the film web or the label, wherein the at least one item of information is one of the price or the product weight and calculated on the basis of the weight value ascertained; and
detecting and verifying the imprint on the film web or the label after the sealing step for conformity with the weight value of the product;
detecting the weight of the package using a rearward weighing device, and
verifying the package weight against the at least one item of information printed onto one of the film web or a label using the control unit or a further control unit.

6. The method according to claim 5, wherein the packaging assembly comprises a thermoform packaging machine and the film web is a cover film.

7. The method according to claim 5, further comprising the step of detecting an identification of a container or of a film section using a second inspection device, and verifying the identification against the at least one item of information printed onto one of the film web or a label using the control unit or a further control unit.

8. A packaging assembly comprising a sealing station for packaging a product with at least one film web, wherein a printer is disposed upstream of the sealing station and configured to print one or more item of information as an imprint onto the film web or onto a label, wherein said one or more item of information comprises at least one of a product weight and an associated retail price, wherein upstream of the sealing station, at least a forward weighing device is provided and configured to detect a weight value and forward the weight value to a control unit, wherein the control unit is configured to control the printer for printing the information depending on the detected weight value onto the film web or onto the label, and that downstream of the sealing station, at least a first inspection device is provided and configured for reading the information on the imprint; and
a second inspection device configured for detecting an identification of a container, and wherein one of the control unit or a further control unit is configured for verifying the identification against the background of the information on the imprint.

9. A method of operating a packaging assembly comprising the steps of:
- sealing a product with a film web at a sealing station in a package;
- printing at least one item of information onto one of the film web or a label using a printer prior to the sealing step;
- detecting a weight value of the product weight of the product using a forward weighing device, wherein the forward weighing device is provided upstream of the sealing station;
- ascertaining the weight value and transmitting the weight value to a control unit using a weighing unit;
- controlling the printer using the control unit to print said at least one item of information onto one of the film web or the label, wherein the at least one item of information is one of the price or the product weight and calculated on the basis of the weight value ascertained; and
- detecting and verifying the imprint on the film web or the label after the sealing step for conformity with the weight value of the product;
- detecting an identification of a container or of a film section using a second inspection device, and
- verifying the identification against the at least one item of information printed onto one of the film web or a label using the control unit or a further control unit.

* * * * *